US008589771B2

(12) United States Patent
Palanki

(10) Patent No.: US 8,589,771 B2
(45) Date of Patent: Nov. 19, 2013

(54) NAK-TO-ACK ERROR DETECTION AND RECOVERY

(75) Inventor: Ravi Palanki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 426 days.

(21) Appl. No.: 12/917,729

(22) Filed: Nov. 2, 2010

(65) Prior Publication Data

US 2011/0055654 A1 Mar. 3, 2011

Related U.S. Application Data

(62) Division of application No. 11/416,849, filed on May 2, 2006, now Pat. No. 7,895,504.

(60) Provisional application No. 60/691,437, filed on Jun. 16, 2005, provisional application No. 60/730,955, filed on Oct. 27, 2005.

(51) Int. Cl.
*H03M 13/00* (2006.01)

(52) U.S. Cl.
USPC .......... 714/776; 714/748

(58) Field of Classification Search
USPC .......... 714/748–751; 370/310
See application file for complete search history.

(56) References Cited

U.S. PATENT DOCUMENTS

| | | | | |
|---|---|---|---|---|
| 5,398,254 A | | 3/1995 | Miya et al. | |
| 5,617,333 A | | 4/1997 | Oyamada et al. | |
| 6,424,625 B1 | * | 7/2002 | Larsson et al. | 370/236 |
| 6,522,665 B1 | | 2/2003 | Suzuki et al. | |
| 6,697,490 B1 | * | 2/2004 | Mizikovsky et al. | 380/262 |
| 7,895,504 B2 | * | 2/2011 | Palanki | 714/776 |
| 2003/0219171 A1 | | 11/2003 | Bender et al. | |
| 2004/0107094 A1 | * | 6/2004 | Fuchigami et al. | 704/220 |
| 2004/0148552 A1 | | 7/2004 | Matsumoto et al. | |

FOREIGN PATENT DOCUMENTS

| | | | |
|---|---|---|---|
| CN | 1516937 | A | 7/2004 |
| JP | 2003273844 | A | 9/2003 |
| WO | WO9830047 | A1 | 7/1998 |
| WO | WO0139386 | A1 | 5/2001 |
| WO | WO03063538 | A1 | 7/2003 |
| WO | WO2006023192 | | 3/2006 |

OTHER PUBLICATIONS

International Search Report—PCT/US2006/025931, International Search Authority—European Patent Office—Apr. 20, 2007.

Physical Layer Procedures (FDD) (3GPP TS 25.214 Version 7.0.0 Release 7) ETSI TS 125 214 V7.0.0, Mar. 2006.

Written Opinion—PCT/US2006/025931, International Search Authority—European Patent Office—mailed on Apr. 20, 2007.

* cited by examiner

*Primary Examiner* — Guy Lamarre
(74) *Attorney, Agent, or Firm* — Donald C. Kordich

(57) ABSTRACT

According to one embodiment, a system is provided that allows a receiver to determine that an initial error message (such as a NAK message) was not correctly received by a transmitter, and to cause the transmitter to continue transmitting information corresponding to data that has not yet been successfully decoded by the receiver. In accordance with another embodiment, the receiver can generate a message (e.g., a continue previous packet message) to correct the transmitter and initiate full recovery at the physical layer.

36 Claims, 12 Drawing Sheets

500

200

NAK-TO-ACK ERROR DETECTION AND RECOVERY

CLAIM OF PRIORITY UNDER 35 U.S.C. §119

The present Application for Patent is a Divisional of patent application Ser. No. 11/416,849 entitled "NAK-TO-ACK ERROR DETECTION AND RECOVERY" filed May 2, 2006, pending, which claims priority to Provisional Application No. 60/691,437 entitled "EFFICIENT NAK TO ACK ERROR DETECTION AND RECOVERY" filed Jun. 16, 2005, and Provisional Application No. 60/730,955 entitled "NAK-TO-ACK ERROR DETECTION AND RECOVERY" filed Oct. 27, 2005, both assigned to the assignee hereof and hereby expressly incorporated by reference herein.

BACKGROUND

1. Field

Several aspects relate generally to wireless communications. For example, certain aspects relate more particularly to correcting error messages sent from a receiver to a transmitter.

2. Relevant Background

In a hybrid automatic repeat request (H-ARQ) system, a transmitter encodes a packet into several codewords. Each of these codewords is then sent to the receiver, as needed, in a different transmission. The receiver, thus, sees a different code rate after each transmission, with a high code rate at the end of the first transmission and a low code rate at the end of the last transmission. Such a system can be used to compensate for channel variations, channel estimation errors, etc. For example, a good channel can support a high code rate and the number of transmission required is small. By the same logic, the required number of transmissions is large in a bad channel.

The transmitter in a hybrid ARQ system utilizes feedback from the receiver to decide when to terminate transmission of the codewords. The feedback is typically in the form of an acknowledgement (ACK) or negative acknowledgment (NAK) message with an ACK indicating that the packet has been successfully decoded from the codeword(s) and a NAK indicating otherwise. These messages are often single-bit messages and, hence, are especially prone to error due to lack of channel coding gain. In other words, an ACK message can relatively easily be mistaken for a NAK and vice versa.

It has been found that an ACK→NAK error, one mistaking an ACK for a NAK, can be detected efficiently and dealt with in a manner that does not significantly affect system performance. However, a NAK→ACK error, one mistaking a NAK for a ACK, is more expensive: the transmitter believes that the packet has been successfully decoded from the codeword(s) when in fact the packet has not been successfully obtained. This causes a packet error and, thus, NAK→ACK errors impose an error floor on the overall packet error rate. These packet errors can be expensive in terms of latency since higher layer protocols, such as the Radio Link Protocol (RLP), are required to correct them. For this reason, such errors need to be detected and corrected as efficiently as possible.

SUMMARY

According to one embodiment, a method is provided for detecting transmission errors in the transmission of a packet of data which has been encoded into multiple codewords, wherein at least two of the codewords comprise a set of correlation data. The method comprises receiving at a receiver a first codeword of data wherein the first codeword of data comprises the correlation data, determining at the receiver an error in decoding the packet of data, transmitting from the receiver an error message so as to indicate the error in decoding the packet of data, receiving at the receiver a second codeword of data, determining at the receiver whether the second codeword of data comprises the correlation data, determining at the receiver that the error message was not received by a transmitter of the second codeword if the second codeword of data does not comprise the correlation data.

According to another embodiment, a method is provided for determining transmission errors by receiving at a receiver transmissions of a plurality of codewords corresponding to an encoded first packet of data, determining at the receiver an error in decoding one of the codewords, transmitting from the receiver a first error message for use by a transmitter of the codewords indicating that an error has occurred in receiving one of the codewords, determining at the receiver that an error has occurred in the transmitter correctly receiving the first error message, transmitting a second error message from the receiver for use by the transmitter so as to indicate to the transmitter that the first error message was not received correctly by the transmitter.

According to another embodiment, a method of determining transmission errors at a transmitter is provided by transmitting a plurality of codewords for an encoded packet of data from a transmitter for use by a receiver, configuring the transmitter to process a first error message indicating that one of the codewords of the encoded packet of data was not decoded correctly by the receiver, receiving a second error message at the transmitter indicating that the first error message was not correctly received by the transmitter.

Similarly, a receiver can be configured according to one embodiment for detecting a transmission error by providing a circuit configured for receiving a first section of the packet of data wherein the first section comprises the correlation data, a circuit configured for determining at the receiver an error in receiving the packet of data, a circuit configured for transmitting from the receiver an error message so as to indicate the error in receiving the packet of data, wherein the circuit configured for receiving the first section is further configured for continuing to receive the packet of data at the receiver and configured for receiving a second section of data of the packet of data, a processor configured for determining at the receiver whether the second section of data comprises the correlation data and configured for determining that the error message was not received by a transmitter of the packet of data if the second packet of data does not comprise the correlation data.

In another embodiment, a receiver is configured for determining a transmission error by providing a circuit configured for receiving transmissions of a plurality of sections of a packet of data, a processor configured for determining at the receiver an error in receiving one of the sections of the packet of data, a circuit configured for transmitting from the receiver a first error message for use by a transmitter of the packet of data indicating that an error has occurred in receiving one of the sections of the packet of data, wherein the processor is further configured for determining that an error has occurred in the transmitter correctly receiving the first error message, wherein the circuit configured for transmitting is further configured for transmitting a second error message from the receiver for use by the transmitter so as to indicate to the transmitter that the first error message was not received correctly by the transmitter.

According to yet another embodiment, a transmitter is configured by providing a circuit configured for transmitting a plurality of sections of a packet of data from a transmitter for use by a receiver, a processor configured for processing a first error message indicating that one of the sections of the packet of data was not received correctly by the receiver, and wherein the processor is further configured for processing a second error message at the transmitter indicating that the first error message was not correctly received by the transmitter.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

DETAILED DESCRIPTION

Figure 1:
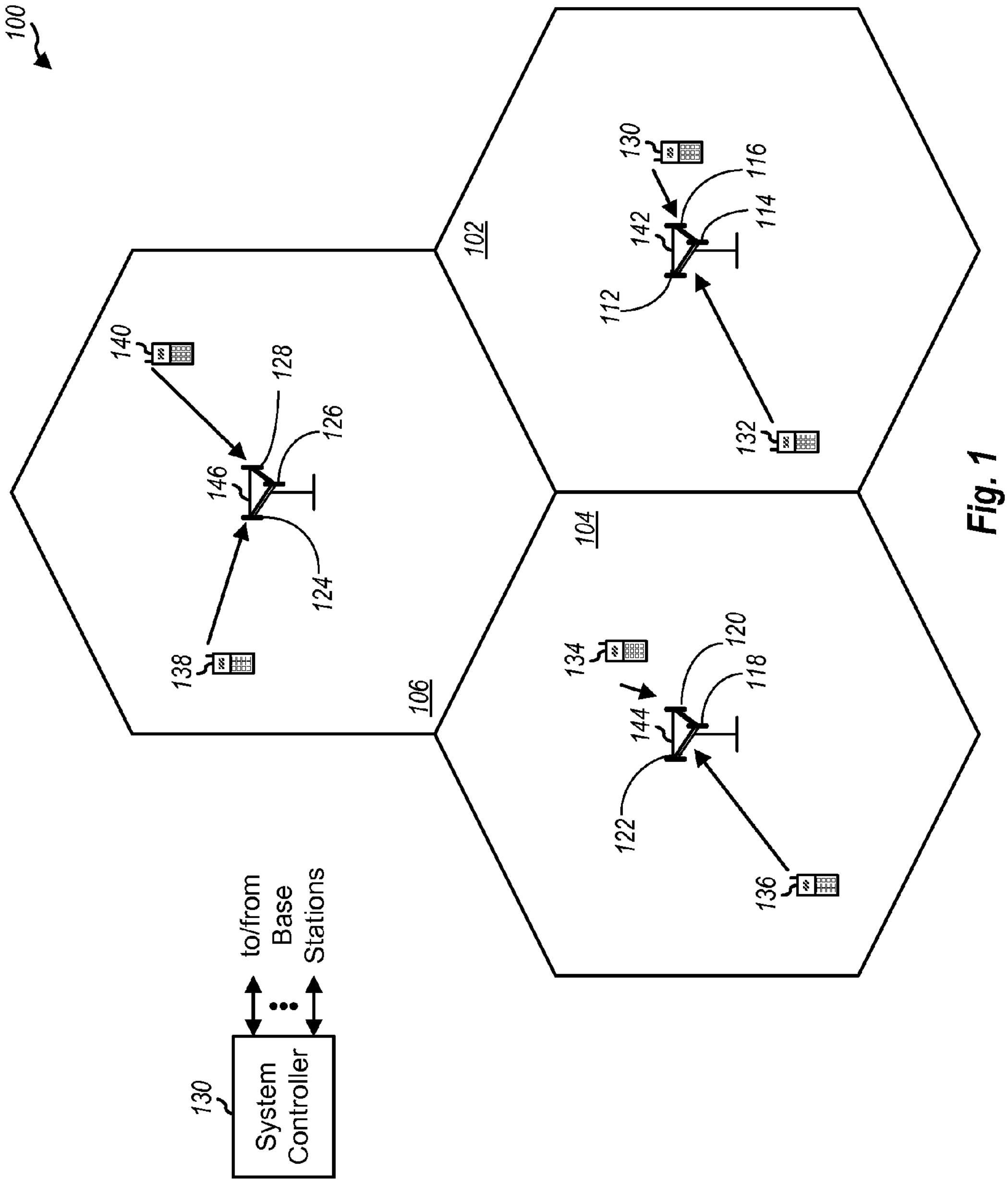
FIG. 1 illustrates aspects of a multiple access wireless communication system.

The ensuing description provides exemplary embodiment (s) only, and is not intended to limit the scope, applicability or configuration of the disclosure. It is understood that various changes may be made in the function and arrangement of elements without departing from the spirit and scope as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, a "storage medium" may be represented as one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as a storage medium. A processor(s) may perform the necessary tasks. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Referring now to FIG. 1, aspects of a multiple access wireless communication system. A multiple access wireless communication system 100 includes multiple cells, e.g., cells 102, 104 and 106. In the embodiment of FIG. 1, each cell 102, 104 and 106 may include an access point that includes multiple sectors. The multiple sectors are formed by groups of antennas each responsible for communication with access terminals in a portion of the cell. In cell 102, antenna groups 112, 114 and 116 each correspond to a different sector. In cell 104, antenna groups 118, 120 and 122 each correspond to a different sector. In cell 106, antenna groups 124, 126 and 128 each correspond to a different sector. In other aspects, unsectorized cells, for example using space division multiple access or some other location specific approach, may also be utilized.

Each cell includes several access terminals which are in communication with one or more sectors of each access point. For example, access terminals 130 and 132 are in communication base 142, access terminals 134 and 136 are in communication with access point 144, and access terminals 138 and 140 are in communication with access point 146.

It can be seen from FIG. 1 that each access terminal 130, 132, 134, 136, 138 and 140 is located in a different portion of its respective cell than each other access terminal in the same cell. Further, each access terminal may be a different distance from the corresponding antenna groups with which it is communicating. Both of these factors provide situations, also due to environmental and other conditions in the cell, which cause different channel conditions to be present between each access terminal and its corresponding antenna group with which it is communicating.

As used herein, an access point may be a fixed station used for communicating with the terminals and may also be referred to as, and include some or all of the functionality of, a base station, a Node B, or some other terminology. An access terminal may also be referred to as, and include some or all of the functionality of, a user equipment (UE), a wireless communication device, terminal, a mobile station, or some other terminology.

Figure 2:
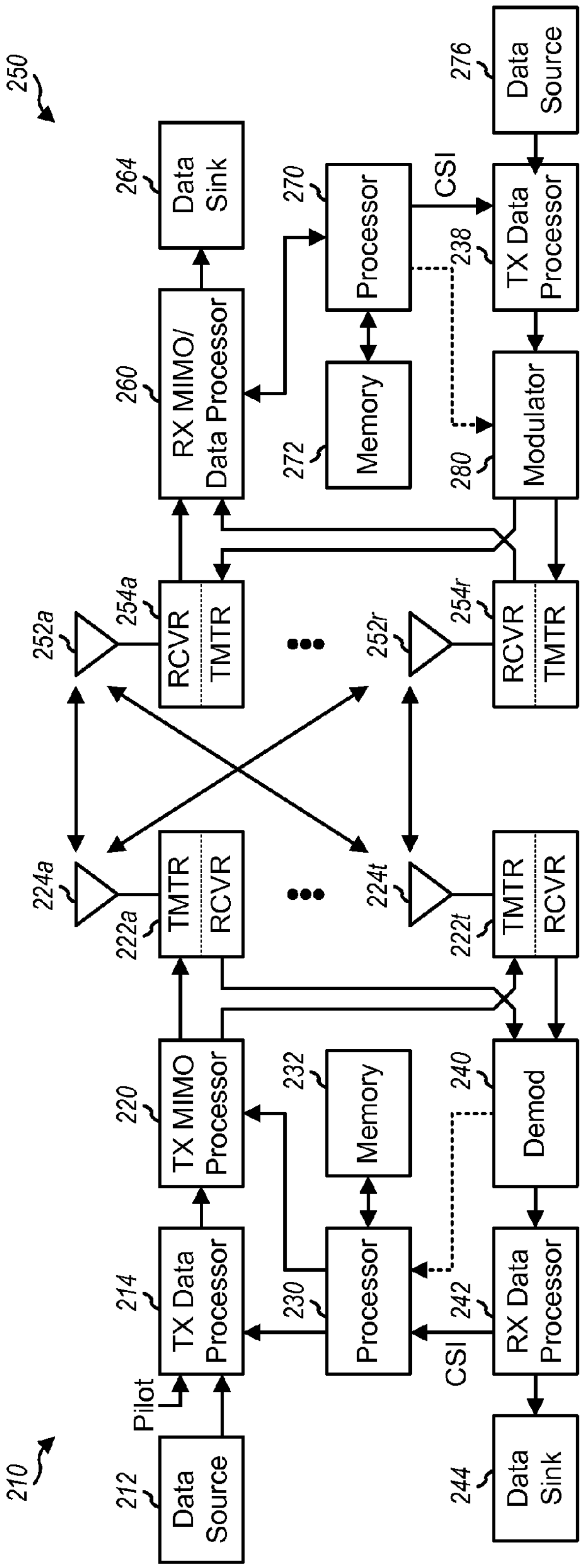
FIG. 2 illustrates aspects of a transmitter and a receiver in a multiple access wireless communication system.

Referring to FIG. 2, aspects of a transmitter and receiver in a multiple access wireless communication system are illustrated. At transmitter system 210, traffic data for a number of data streams is provided from a data source 212 to a transmit (TX) data processor 214. In an embodiment, each data stream is transmitted over a respective transmit antenna. TX data processor 214 formats, codes, and interleaves the traffic data for each data stream based on a particular coding scheme selected for that data stream to provide coded data. In some embodiments, TX data processor 214 applies beamforming weights to the symbols of the data streams based on the user to which the symbols are being transmitted and the antenna from which the symbol is being transmitted. In some embodiments, the beamforming weights may be generated based on channel response information that is indicative of the condition of the transmission paths between the access point and the access terminal. The channel response information may be generated utilizing channel state information (CSI) or channel estimates provided by the user. Further, in those cases of scheduled transmissions, the TX data processor 214 can select the packet format based on rank information that is transmitted from the user.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed on or provided by processor 230. In some embodiments, the number of parallel spatial streams may be varied according to the rank information that is transmitted from the user.

The modulation symbols for all data streams are then provided to a TX MIMO processor 220, which may further process the modulation symbols (e.g., for OFDM). TX MIMO processor 220 then provides $N_T$ symbol streams to $N_T$ transmitters (TMTR) 222*a* through 222*t*. In certain embodiments, TX MIMO processor 220 applies beamforming weights to the symbols of the data streams based on the user to which the symbols are being transmitted and the antenna from which the symbol is being transmitted from that user's channel response information.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222*a* through 222*t* are then transmitted from $N_T$ antennas 224*a* through 224*t*, respectively.

At receiver system 250, the transmitted modulated signals are received by $N_R$ antennas 252*a* through 252*r* and the received signal from each antenna 252 is provided to a respective receiver (RCVR) 254. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide the rank number of "detected" symbol streams. The processing by RX data processor 260 is described in further detail below. Each detected symbol stream includes symbols that are estimates of the modulation symbols transmitted for the corresponding data stream. RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

The channel response estimate generated by RX processor 260 may be used to perform space, space/time processing at the receiver, adjust power levels, change modulation rates or schemes, or other actions. RX processor 260 may further estimate the signal-to-noise-and-interference ratios (SNRs) of the detected symbol streams, and possible other channel characteristics, and provide these quantities to a processor 270. RX data processor 260 or processor 270 may further derive an estimate of the "effective" SNR for the system. Processor 270 may then provide the CSI, which may comprise various types of information regarding the communication link and/or the received data stream. For example, the CSI may comprise only the operating SNR or a quantized SNR estimate. The CSI is then processed by a TX data processor 238, which also receives traffic data for a number of data streams from a data source 276, modulated by a modulator 280, conditioned by transmitters 254*a* through 254*r*, and transmitted back to transmitter system 210.

At transmitter 210, the modulated signals from receiver system 250 are received by antennas 224, conditioned by receivers 222, demodulated by a demodulator 240, and processed by an RX data processor 242 to recover the CSI reported by the receiver system. The reported CSI is then provided to processor 230 and used to (1) determine the data rates and coding and modulation schemes to be used for the data streams and (2) generate various controls for TX data processor 214 and TX MIMO processor 220.

At the receiver, various processing techniques may be used to process the $N_R$ received signals to detect the $N_T$ transmitted symbol streams. These receiver processing techniques may be grouped into two primary categories (1) spatial and space-time receiver processing techniques (which are also referred to as equalization techniques); and (2) "successive nulling/equalization and interference cancellation" receiver processing technique (which is also referred to as "successive interference cancellation" or "successive cancellation" receiver processing technique).

A MIMO channel formed by the $N_T$ transmit and $N_R$ receive antennas may be decomposed into $N_S$ independent channels, with $N_S \le \min\{N_T, N_R\}$. Each of the $N_S$ independent channels may also be referred to as a spatial subchannel (or a transmission channel) of the MIMO channel and correspond to a dimension.

While FIG. 2 is discussed in the context of an OFDMA system or MIMO system, the techniques described herein may be used for various wireless communication systems such as a single carrier frequency division multiple access (SC-FDMA) system, a frequency division multiple access (FDMA) system, a code division multiple access (CDMA) system, a time division multiple access (TDMA) system, and so on. Further, a single-input single-output (SISO) or multiple-input single-output (MISO) may be utilized. An SC-FDMA system may utilize interleaved FDMA (IFDMA) to transmit on subbands that are distributed across the system bandwidth, localized FDMA (LFDMA) to transmit on a group of adjacent subbands, or enhanced FDMA (EFDMA) to transmit on multiple groups of adjacent subbands. In general, modulation symbols are sent in the frequency domain with OFDM and in the time domain with SC-FDMA.

An SC-FDMA symbol may be generated as follows. N modulation symbols to be sent on N assigned subbands are transformed to the frequency domain with an N-point fast Fourier transform (FFT) or discrete Fourier transform (DFT) to obtain N frequency-domain symbols. The N frequency-domain symbols are mapped to the N assigned subbands, and zero symbols are mapped to the remaining K-N subbands. A K-point IFFT or IDFT is then performed on the K frequency-domain symbols and zero symbols to obtain a sequence of K time-domain samples. The last C samples of the sequence are copied to the start of the sequence to form an SC-FDMA symbol that contains K+C samples. SC-FDMA demodulation may be performed in the manners known in the art.

Known approaches for generating and demodulating EFDMA, LFDMA, and IFDMA symbols may also be utilized.

Encoding

In order to send a packet of data, the packet of data can be encoded by the transmitter prior to transmission. A variety of encoding schemes can be used to encode the packet of data. For example, once such encoding scheme is referred to as a non-zero rate code. One example of the non-zero rate code is a turbo code. Such a coding scheme takes a data packet as input and generates codewords that can be utilized by a decoder to recover the packet. The codewords can contain redundant data so that if they are attenuated or noisy when received at the receiver, the redundant data and subsequent codewords can be utilized in the decoding process. For example, in a turbo encoding scheme, a first codeword can be generated along with additional codewords that contain redundant data to the first codeword or preceding codewords. Thus, efficiency can be introduced in that it may be entirely possible for the receiver to decode the first codeword without needing to receive subsequent codewords. However, if the first codeword cannot be decoded to obtain the original packet of data, then subsequent codewords can be transmitted by the transmitter to a receiver. As noted earlier, these subsequent codewords can contain redundant data or, for example, additional parity data that allows them to assist the receiver in decoding the encoded packet. Transmissions of additional codewords can be made as well so as to provide additional opportunities for decoding the encoded packet.

Figure 3:
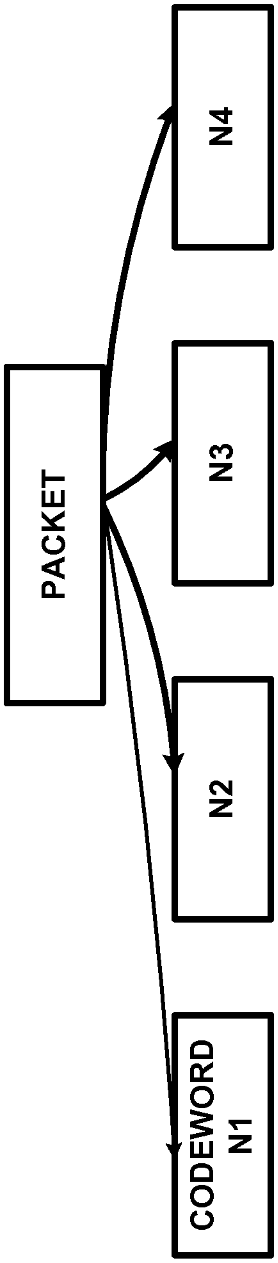
FIG. 3 illustrates aspects of encoding of a packet according to a hybrid ARQ encoding scheme.
Figure 4:
FIG. 4 illustrates aspects of a sequence of transmitted codewords according to a hybrid ARQ transmission scheme.

FIG. 3 illustrates aspects of encoding. In FIG. 3 a packet of data can be encoded so as to provide four codewords, $N_1$, $N_2$, $N_3$ and $N_4$. FIG. 4 illustrates that these codewords can be transmitted from the transmitter according to certain aspects. In FIG. 4, the codewords are transmitted to the receiver in the sequence $N_1$, $N_2$, $N_3$ and $N_4$, and $N_1$.

In many cases, a non-zero rate code (such as a rate 1/5 turbo code) is used to encode a packet. However, the overall code rate often drops to below that rate by the time of the packet transmission. Once this occurs, codeword bits have to be repeated. Thus, they provide, in the example of FIG. 4, that $N_1$ can be repeated.

Error Detection and Correction

When a codeword is received by the receiver and the receiver is unable to decode the codeword so as to obtain the packet of data, the receiver can transmit an error signal to the transmitter indicating that the receiver was unable to decode the codeword successfully. Such a signal is referred to as a "NAK" signal, which may also be absence of an ACK. The transmitter understands that, by virtue of the NAK signal, a second codeword should be transmitted to the receiver. Thus, for example, it can transmit codeword $N_2$ in FIG. 3. The process is repeated with successive codewords until the receiver can successfully decode the encoded packet. Upon successful decoding, the receiver can send an "ACK" signal to the transmitter. The transmitter understands an ACK signal to mean that the receiver has successfully decoded the encoded packet of data and no further transmission of codewords is required. Thus, depending on the clarity of the channel, a receiver may be able to send an ACK signal after receiving the first codeword. Thus, in the example of FIG. 4, the transmitter would not need to send codewords $N_2$, $N_3$ and $N_4$ or the second transmission of $N_1$.

However, a bad channel can produce errors in the transmission of the NAK and ACK signals. Thus, for example, transmission of an ACK signal could mistakenly be understood by the transmitter to be a NAK signal. The transmission system can relatively easily recover from such an error. However, if a NAK signal is sent by the receiver and misunderstood by the transmitter to be an ACK signal, the transmitter will cease transmitting the codewords for the first packet of data and begin sending codewords for a new or second packet of data. As a result, a packet error will occur and the error will have to be corrected at a layer higher than the physical layer of the transmission system. The need to correct such errors at a higher level produces greater delay than would be necessary at the physical level. Thus, there is a need to provide an efficient system that can correct such errors at the physical level.

Shown below are two sequences of sending codewords for packets A and B.

$A_1\ A_2\ A_3\ A_4\ A_5\ A_6\ B_1\ B_2$ $A_1\ A_2\ B_1\ B_2\ B_3\ B_4\ B_5\ B_6$

The sequences shown above illustrate the transmission of codewords for packets A and B. In the first example, codewords for packet A are sent as codewords: $A_1\ A_2\ A_3\ A_4\ A_5\ A_6$. Thus, this implies that a NAK signal is received after reception of codewords $A_1\ A_2\ A_3\ A_4$ and $A_5$. In the second example, the transmission of the sequence of codewords $A_1\ A_2\ B_1\ B_2\ B_3$ and $B_4$ indicates that upon reception of the codeword $A_2$, an ACK signal was sent from the receiver to the transmitter, indicating that the transmitter could begin sending packet B. However, if the receiver actually sent a NAK signal that was corrupted and understood by the transmitter erroneously to be an ACK signal, this same sequence would result. According to one embodiment, a system is provided for determining that such an error has occurred by the receiver so that the receiver can correct the error by notifying the transmitter. This can be accomplished in accordance with one embodiment by utilizing common data in received codewords to confirm that the receiver is still receiving codewords for an encoded packet prior to an ACK signal being sent by the receiver. If codewords that the receiver expects to have correlation data do not have such correlation data, this indicates to the receiver that a NAK signal has been corrupted and erroneously understood by the transmitter to be an ACK signal, thus causing the transmitter to begin transmitting codewords for a second packet of data and in which those codewords do not have correlation data expected by the receiver.

In certain aspects, correlation data can be common data or bits. In other aspects the correlation data may be any group of bits such that they are orthogonal to bits or data from other packets transmitted during a predetermined time period, e.g. HARQ retransmissions. In other aspects, this may be a physical packet order transmission indicator that may indicate the transmission order of the packet from a given antenna or antennas. In further aspects, this may be some other indicator. Correlation data in some embodiments may be the entirety of the data portion of a packet.

Figure 5:
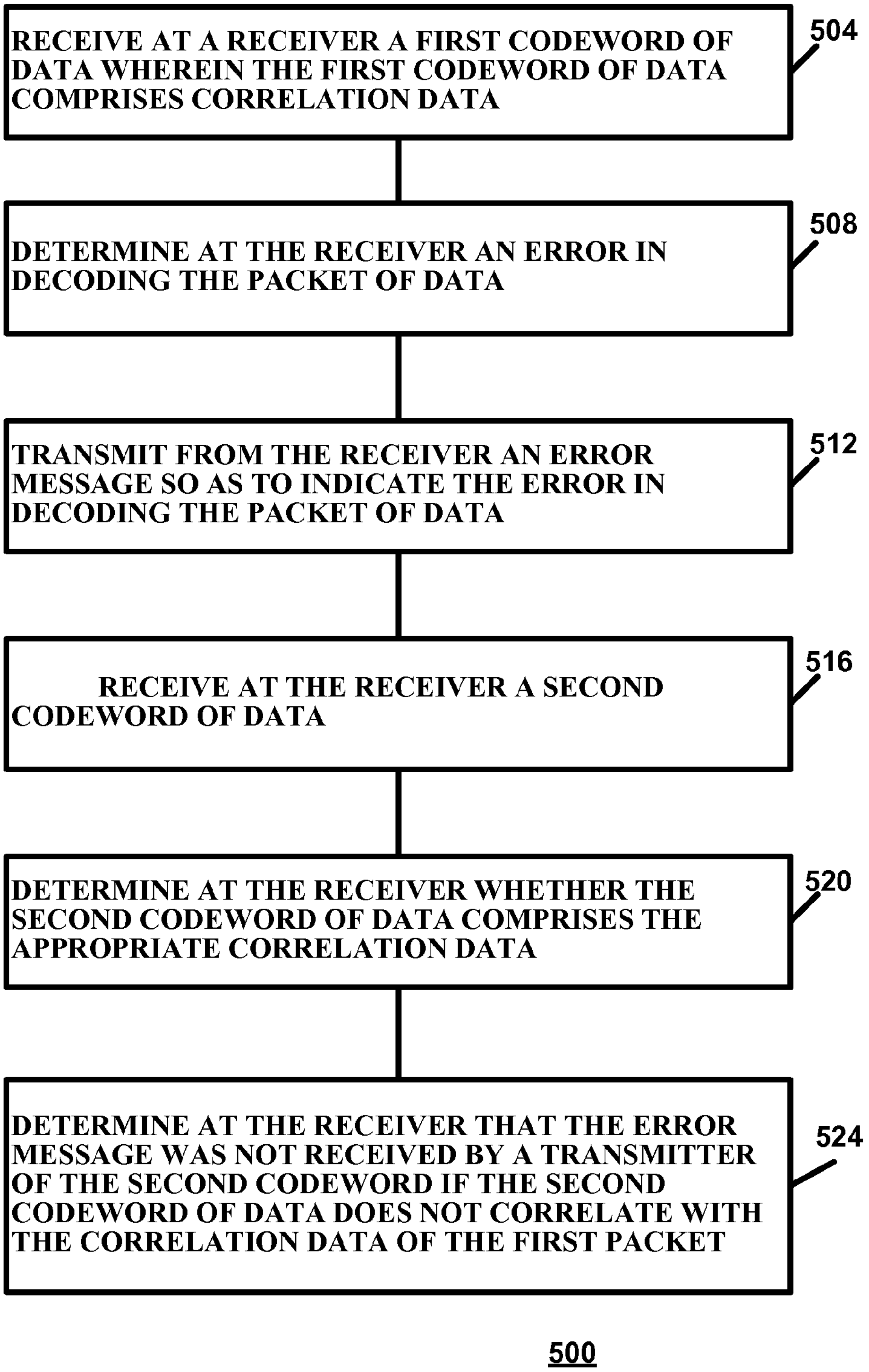
FIG. 5 illustrates a flow chart demonstrating aspects of a method of determining failed error messages.

Referring now to FIG. 5, a flow chart 500 demonstrating aspects of a method of determining an erroneous reception by the transmitter is illustrated. Block 504 shows that a receiver receives a first codeword of data wherein the first codeword of data contains correlation data. Correlation data is understood to be data that can be used to correlate a first codeword with a second codeword. For example, it could be a portion of a received set of data in predetermined bit positions in that set of data that is the same for two or more codewords. Similarly, it could be data that is part of a header used to transmit the codewords. Thus, the correlation data could be positioned in a predetermined location in each header that is utilized to send the codewords. In block 508, a determination is made at the receiver that an error in decoding the packet of data has occurred. For example, such an error may occur when a codeword is received but has been corrupted by virtue of being attenuated or transmitted through a noisy channel. Thus, the receiver would be unable to decode the codeword to obtain the original packet of data. Consequently, the receiver would deem this to be a decoding error. In block 512, the receiver can transmit from the receiver an error message to indicate the error in decoding the packet of data. For example, the receiver could transmit a NAK error message to the transmitter. In block 516, a second codeword is received at the receiver. The receiver can determine whether this second codeword of data contains the appropriate correlation data as shown in block 520, e.g. the same correlation data or non-orthogonal correlation data. It should be noted that this need not be limited to just the correlation data of the second codeword and the correlation data may be correlated across a plurality of codewords. Finally, in block 524, a determination can be made at the receiver that the error message originally transmitted in block 512 was not received at the transmitter of the second codeword if the second codeword does not correlate. Thus, for example, if the receiver sends an error message that is not properly received at the transmitter—for example, a NAK message is misinterpreted as an ACK message—the transmitter will begin transmitting codewords associated with a new packet of data. The receiver, however, will still be expecting codewords associated with the first packet of data. Therefore, when the receiver goes to compare correlation data and gets a very low correlation between a first codeword and a subsequent codeword, the receiver will be able to determine that the low correlation indicates that the second codeword is really associated with a new packet of data. Consequently, the receiver will realize that the transmitter did not correctly receive the NAK message and instead mistakenly understood it to be an ACK message that caused the transmitter to begin sending the codewords for the second packet of data. In addition, their may be a determination of no correlation if no further codewords are received at the receiver after transmitting the error message for the first codeword or groups of codewords.

Figure 6:
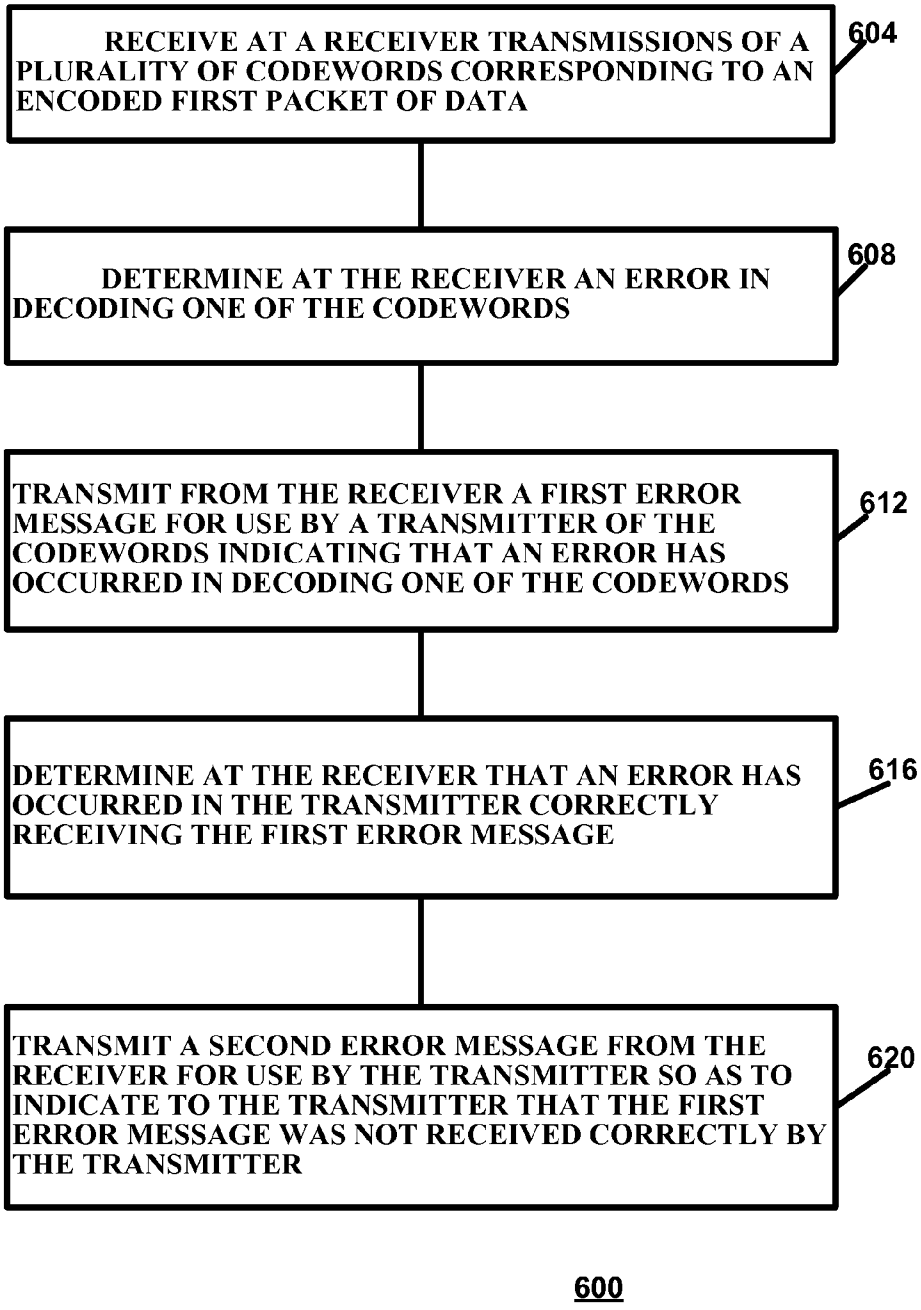
FIG. 6 illustrates a flow chart demonstrating aspects of a method of correcting failed error messages.

FIG. 6 illustrates another flow chart 600 demonstrating aspects of a method of correcting an error when a transmitter does not receive correctly an initial error message. Block 604 shows that a receiver can receive transmissions of multiple codewords corresponding to a first encoded packet of data. In block 608, a determination is made at the receiver that an error has occurred in decoding one of the codewords. Furthermore, in block 612, the receiver can transmit a first error message for use by the transmitter of the codewords to indicate that the error has occurred in decoding one of the codewords. In block 616, a determination is made at the receiver that an error has occurred in the transmitter receiving the first error message. Thus, as noted earlier, this can occur when an error message sent by the receiver to the transmitter is attenuated to such a degree that the transmitter incorrectly interprets the error message. For example, this can occur when a transmitter interprets a NAK message as an ACK message. In addition, their may be a determination of no correlation if no further codewords are received at the receiver after transmitting the error message for the first codeword or groups of codewords. In block 620, the receiver can transmit a second error message from the receiver to the transmitter for use by the transmitter so as to indicate to the transmitter that the first error message was not correctly received by the transmitter.

Figure 7:
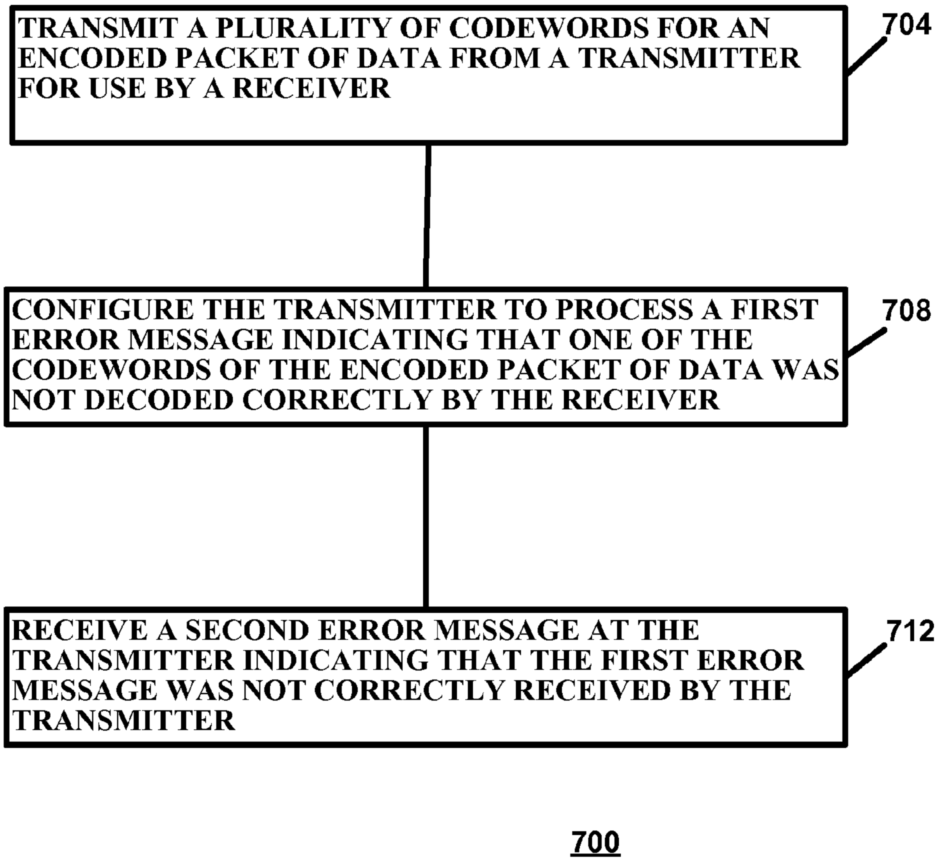
FIG. 7 illustrates a flow chart demonstrating aspects of a method of communicating the occurrence of failed error messages.

FIG. 7 illustrates yet another embodiment of aspects of the disclosure from the perspective of the transmitter. In block 704, the transmitter transmits multiple codewords for an encoded packet of data for use by a receiver. Furthermore, the transmitter is configured to process a first error message—such as a NAK message—received from the receiver indicating that one of the codewords of the encoded packet of data was not decoded correctly by the receiver. In addition, block 712 illustrates that a second error message can be received by the transmitter and used to indicate that the first error message was not correctly received by the transmitter.

Figure 8:
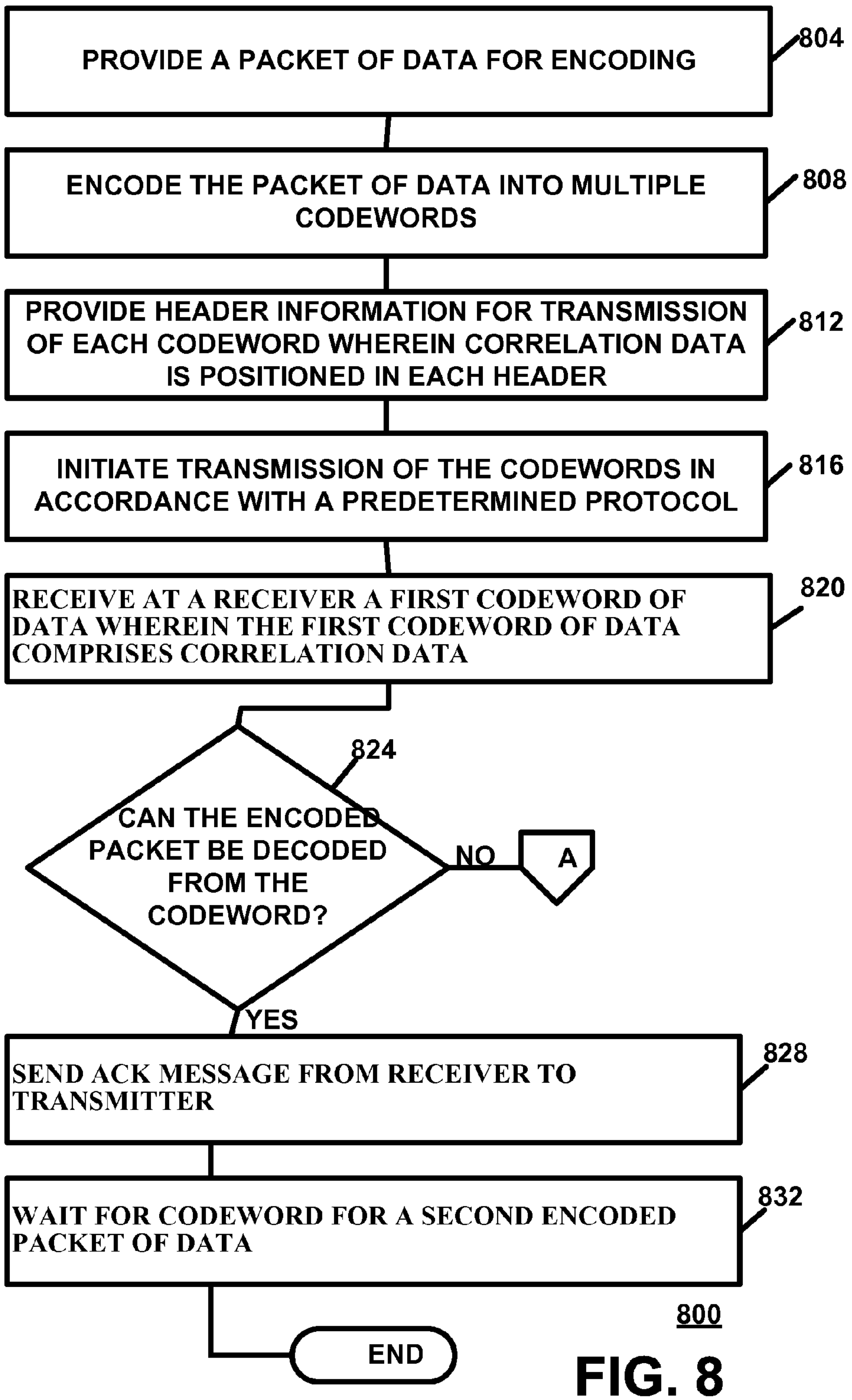
FIGS. 8, 9 and 10 illustrate a flow chart demonstrating aspects of a method of determining the occurrence of a failed error message at a receiver and communicating the occurrence of the failed error message to a transmitter.
Figure 9:
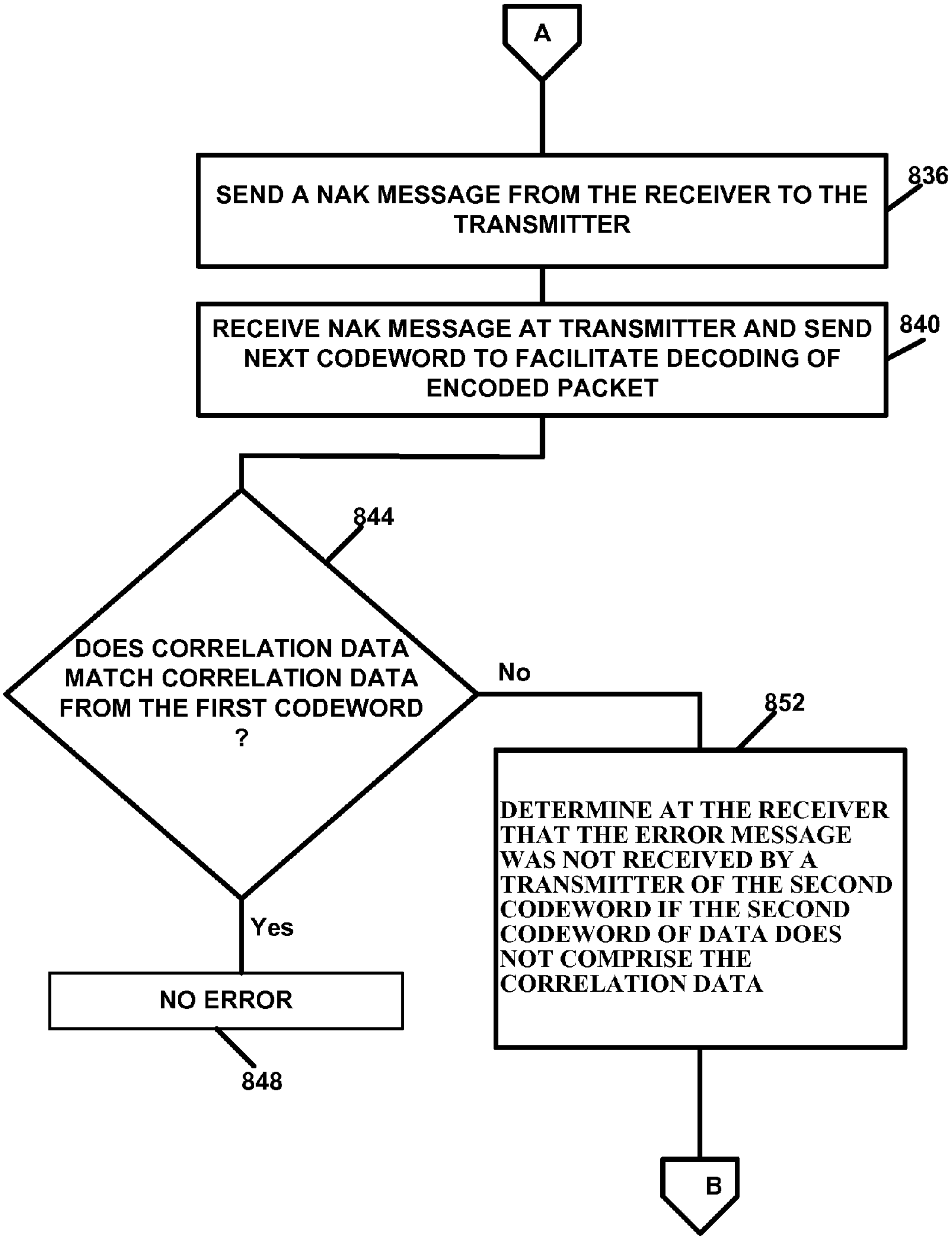
Figure 10:
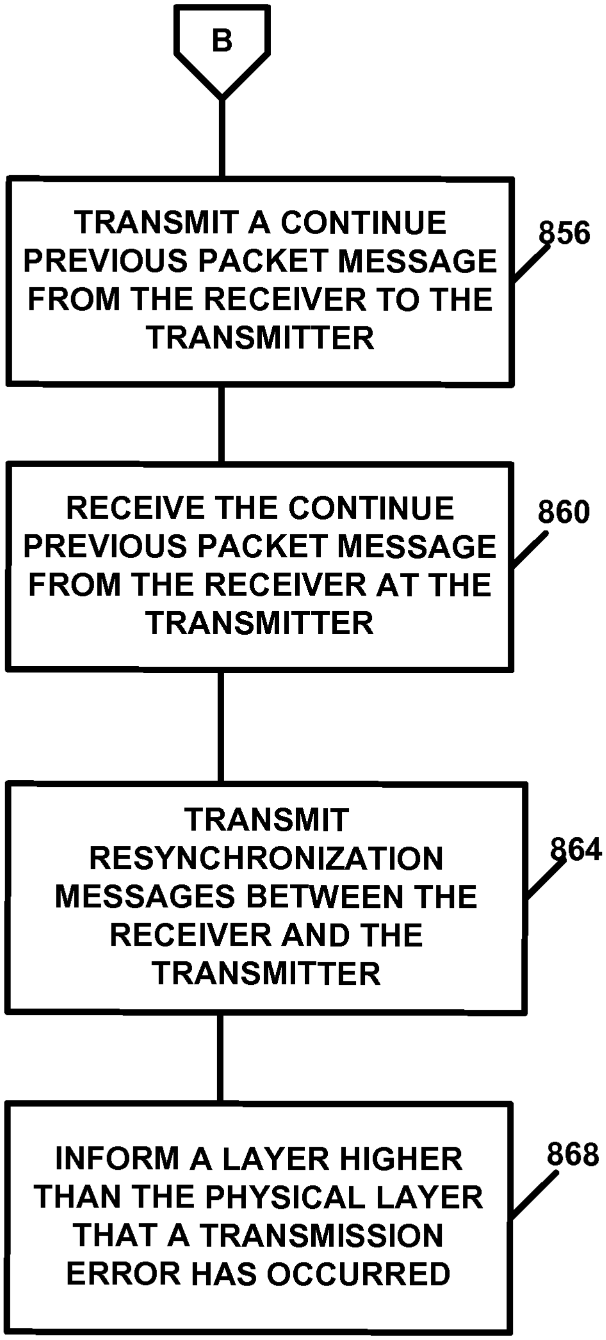

FIGS. 8, 9 and 10 illustrate further aspects of the disclosure. In block 804, a packet of data for transmission from a transmitter to a receiver is provided. The packet of data is first encoded according to an encoding scheme such as a turbo encoding scheme. The packet of data can thus be encoded into multiple codewords as shown by block 808. For example, in accordance with a turbo coding scheme, decoding of a first codeword is possible by a receiver when a clear channel is used. However, when the receiver cannot properly decode the first codeword, successive codewords that contain redundant data can be transmitted successively that allow the decoder of the receiver to more reliably decode the received codewords. In block 812, one example of providing correlation data is shown in that header information can be provided for transmission of each codeword when the header information includes a designated data slot for correlation data.

Figure 11:
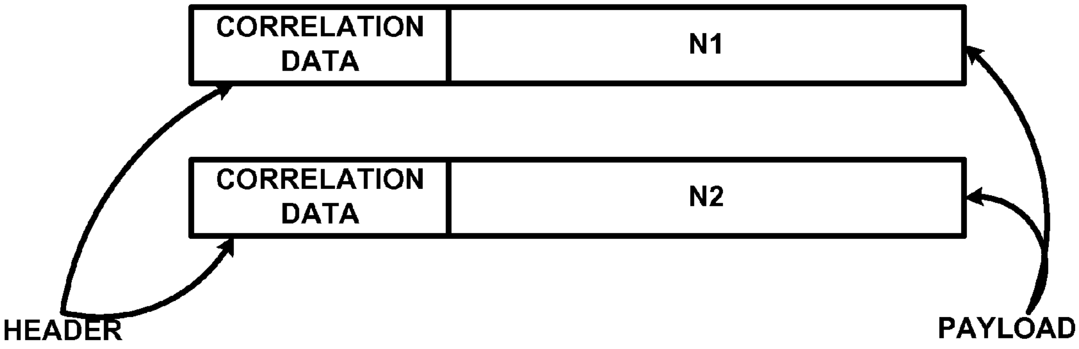
FIG. 11 illustrates two codewords for an encoded packet having aspects of correlation data.

Referring to FIG. 11, correlation data for the transmission of codewords $N_1$ and $N_2$ is shown disposed in the headers used for transmitting the $N_1$ and $N_2$ codewords.

Use of a header to provide correlation data is merely one example of how correlation data can be provided. When a sequence of codewords is transmitted, such as $N_1\ N_2\ N_3\ N_4\ N_1$, the first and last transmissions of the $N_1$ codeword result in correlation data being present in both the first and last transmissions of $N_1$ since it is the same set of data. To determine if two sets of data have a high correlation to one another, the corresponding data bits in two sets of correlation data can be multiplied with one another and added. For example bits a1, a2, a3, a4, and a5 from a first codeword can be multiplied with bits b1, b2, b3, b4, and b5 from a second codeword and summed:

$$a1*b1+a2*b2+a3*b3+a4*b4+a5*b5=Z.$$

One would expect that a larger sum (Z) would result from two sets of data that are the same or substantially the same (some bits may have been corrupted during the transmission process causing the sets of received correlation data not to be exactly the same) and a sum (Z) to be much smaller when the two sets of data do not have the same correlation data. Thus, a predetermined threshold can be set for the sum Z as a test. For example, the sum Z could be set at 3 or above when Z is expected to be 5 under ideal conditions. The choice of the actual value used will be dependent upon the number of bits used in the set of correlation data and the transmission conditions.

In block 816, the transmitter initiates transmission of the first codeword in the sequence of codewords in accordance with a predetermined protocol so that a first codeword is transmitted. The first codeword is received at the receiver as shown in block 820. Furthermore, block 820 indicates that this first codeword can include correlation data. In block 824, a determination is made as to whether the codeword can be decoded so as to obtain the data packet that was encoded. If the packet can be obtained from the decoding process at the receiver, the receiver sends an ACK message to the transmitter in block 828. In block 832, the receiver can then wait for a second encoded packet of data represented by an associated codeword for the second packet of data.

Referring again to block 824, if the packet cannot be decoded from the codeword, a NAK message can be sent from the receiver to the transmitter as shown by block 836. The NAK message indicates that the receiver could not properly decode the codeword message that was sent by the transmitter. Often, attenuation and noise will corrupt a transmitted codeword so as to introduce errors in the received codeword that make it impossible for the receiver to properly decode the received codeword. In block 840, the NAK message is received at the transmitter. The transmitter can, thus, send the next codeword in the sequence of codewords corresponding to the encoded packet. This is shown in block 840. In decision block 844, a determination is made by the receiver as to whether two codewords received by the receiver for a supposed encoded packet have matching correlation data. This determination helps ensure that the transmitter has not started to send codewords associated with a new packet of data. Thus, a check can be implemented to determine if two codewords both contain a common set of correlation data. For example, when the sequence $N_1$, $N_2$, $N_3$, $N_4$, $N_1$ is transmitted by a transmitter to a receiver, the receiver can compare designated bit positions in the first and last transmissions of $N_1$. The receiver would expect that the corresponding bit positions would have the same values. If they do not and there is a very low correlation between the codewords, the receiver can infer that the transmitter did not correctly receive a NAK message and thus started sending codewords for a new packet of data. This is shown in block 852.

In block 856, the receiver can transmit a second error message which can be referred to as a continue previous packet message from the receiver to the transmitter. The transmitter receives the continue previous packet message from the receiver at the transmitter shown in block 860. The continue previous packet message can be a single-bit message that accompanies the ACK and NAK single-bit messages. Such a continue previous packet message is used to indicate to the transmitter to stop sending codewords corresponding to the second packet and to continue sending the previous codewords corresponding to the previous packet. Thus, for the sequence of codewords $N_1$, $N_2$, $N_3$, $N_4$, $N_1$, if the transmitter previously sent $N_1$ and $N_2$ before moving on to the second encoded packet, the transmitter upon reception of the continue previous packet could pick up again with $N_3$—since it would have a record that it previously only sent $N_1$ and $N_2$.

While the continue previous packet message can be used by the transmitter to pick up in transmitting codewords for the first encoded packet of data where the transmitter previously left off, alternative schemes could be used as well. For example, the continue previous packet message could be utilized to resynchronize the transmitter and receiver prior to transmitting the sequence of codewords from the beginning. Alternatively, the sequence of codewords could be started from the beginning without performing the resynchronization of transmitter and receiver. This allows the receiver and transmitter to correct the error at the physical layer without involving upper layers. However, as illustrated by block 868, an alternative correction scheme would be to notify a layer higher than the physical layer that a transmission error has occurred and to allow the higher layer to correct the error—for example, allowing the error to be corrected at the media access control sublayer (MAC) or logical link control (LLC) sublayer of the data link layer or a higher layer of the OSI model, i.e., network, transport, presentation, or application layers. However, this would typically introduce a longer delay than that which would be experienced by correcting the error at the physical layer.

FIGS. 14, 15, and 16 illustrate block diagrams of aspects of systems that can be utilized for detecting transmission errors. Such systems can be utilized for implementing systems described herein, for example.

Determining Assignment Errors

The correlation techniques described above can be used in one embodiment to detect and correct assignment errors in a transmission system. For example, in a wireless system, different devices are assigned to operate on different frequency ranges or other communication resources. Often, the base station will track which devices are assigned to a particular frequency range or other communication resource. Furthermore, a device can periodically or intermittently be re-assigned to a different frequency range or other communication resource. However, errors can occur when a device does not receive a re-assignment command and continues operating on an old assigned frequency range or other communication resource. This can result in two transmitters operating at the same frequency range, or other communication resource, which produces interference between the two signals of the transmitters.

Figure 13:
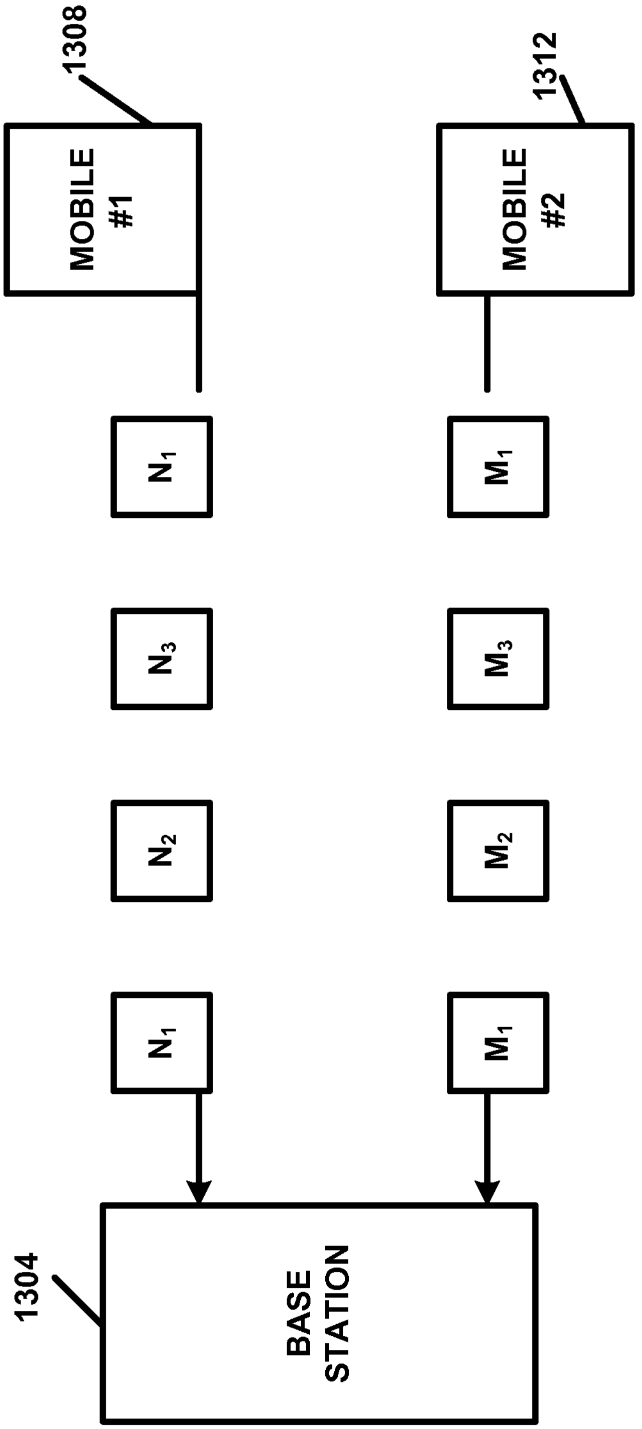
FIG. 13 illustrates a block diagram of aspects of two transmitters operating at the same designated frequency range and producing interfering signals.

In accordance with one embodiment, such assignment errors can be detected. Furthermore, they can be corrected with one embodiment. FIG. 13 illustrates an example of two mobile units operating on the same frequency range. In this example, Mobile device #1 1308 is assigned to the designated frequency range and Mobile device #2 1312 is not. However, both Mobile device #1 and Mobile device #2 operate on the same frequency range due to a missed assignment or other error. Consequently, FIG. 13 shows both mobile devices sending sets of data. Mobile device #1 sends data stream N1, N2, N3, N1 while Mobile device #2 sends data stream M1, M2, M3, M1. Base station 1304 receives these signals. However, due to the interference of the signals, base station 1304 is unable to decode the signals. Yet, base station 1304 is able to use correlation tests to determine which mobile units are transmitting the signals.

Figure 12:
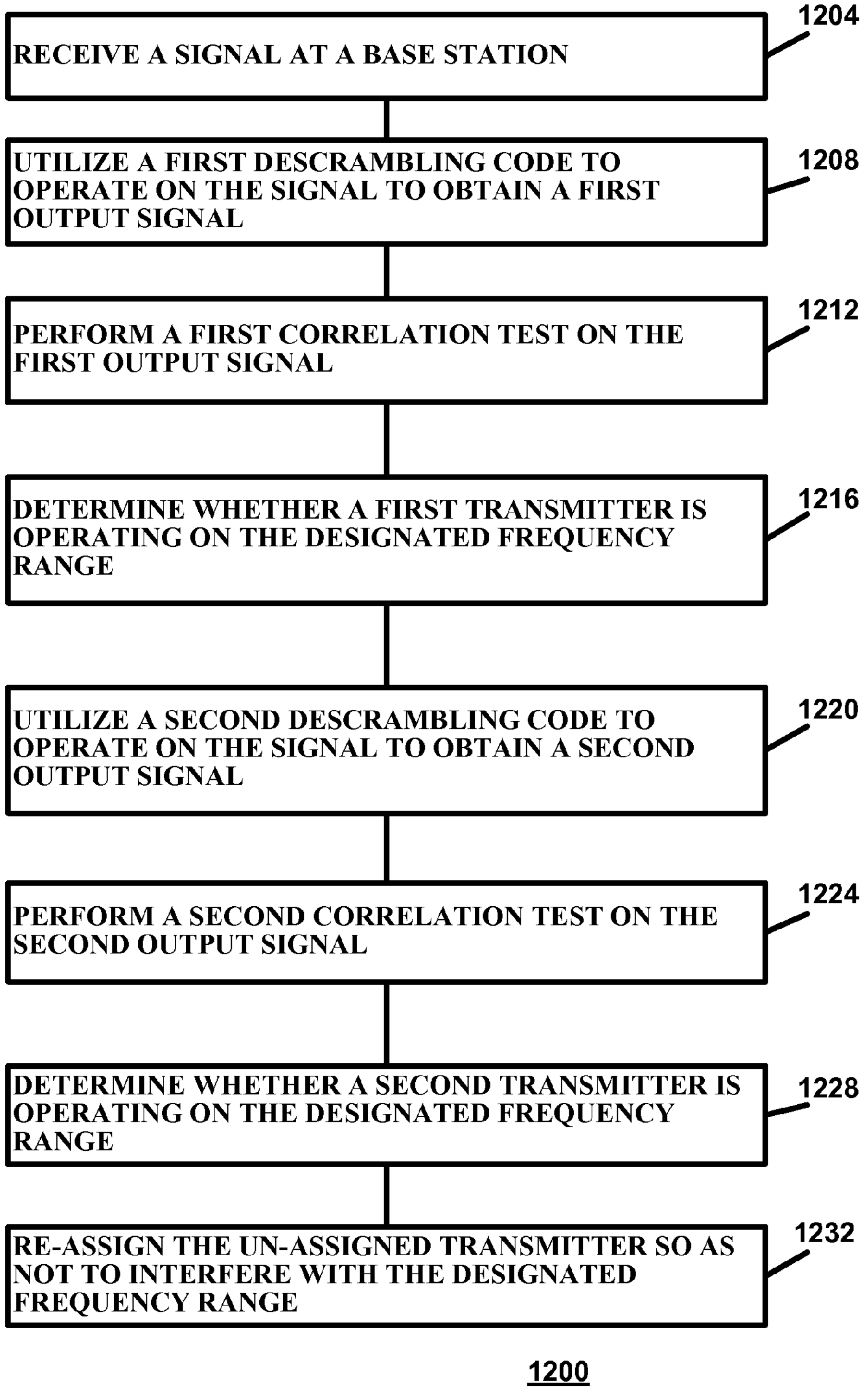
FIG. 12 illustrates a flow chart demonstrating aspects of a method of detecting interfering transmissions by two transmitters.

FIG. 12 illustrates a flow chart 1200 that demonstrates aspects of a method of determining the assignment error described above. In block 1204, a signal is received at a base station. Often, this will be a noisy signal resulting from both transmitters transmitting at the same time. In block 1208, a first descrambling code associated with the first mobile unit is utilized to operate on the signal so as to obtain a first output signal. In block 1212, a first correlation test is performed on the first output signal. The correlation test can be performed as described above. For example, the base station can compare a first received codeword with a last received codeword and compare corresponding bit positions. In the example of FIG. 13, one would expect the bits of the first N1 set of data to match the second N1 set of data. Alternatively, one could compare header information used as correlation data. If the correlation satisfies a predetermined threshold, then the base station can determine that the transmitter associated with the first descrambling code is the source of one of the transmissions, as illustrated in block 1216.

In block 1220, the base station can test for a second transmitter by utilizing a second descrambling code to operate on the signal to obtain a second output signal. Furthermore, in block 1224, a second correlation test can be performed on the second output signal. For example, bit positions in the first transmission of M1 and the second transmission of M1 can be compared to see if there is a correlation. Or, for example, header information could be used to perform the test. In block 1228, a determination can be made as to whether the second transmitter is transmitting at the designated frequency range. Essentially, if the correlation test is satisfied, then the base station will have identified the second transmitter as operating at the designated frequency range. Since the base station knows which of the two transmitters is actually assigned to the designated frequency range, the base station can re-assign one or both transmitters to different frequency ranges. This can be accomplished for example by the base station transmitting a signal to the second transmitter instructing the second transmitter to move to a different frequency range. In this manner, the system allows the base station to identify which transmitter is responsible for the interference and to correct the error. Furthermore, it allows the error to be corrected at the physical layer without involving higher layers of the OSI model.

It should be noted that while the discussion with respect to FIGS. 12 and 13 utilize frequency ranges as the assigned resources, they may also be time slots, OFDM symbols, subcarriers, or combinations of these.

It should be understood that use of variations of the word "received" (in the context of error messages intended for a transmitter being improperly received by the transmitter) includes not only the situation where the error message is corrupted and thus misinterpreted by the transmitter but also situations where the transmitter receives a signal that is arguably correct under certain standards but still misinterpreted, not properly utilized, and/or not properly responded to by the transmitter.

The techniques described herein may be implemented by various means. For example, these techniques may be implemented in hardware, software, or a combination thereof. For a hardware implementation, the processing units within a access point or a access terminal may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

While various embodiments have been described as methods or apparatus for implementation, it should be understood that they can be implemented through code coupled to a computer, e.g., code resident on a computer or accessible by the computer. For example, software and databases could be utilized to implement many of the methods discussed above. Thus, in addition to embodiments accomplished by hardware, it is also noted that these embodiments can be accomplished through the use of an article of manufacture comprised of a computer usable medium having a computer readable program code embodied therein, which causes the enablement of the functions disclosed in this description. Therefore, it is desired that embodiments also be considered protected by this patent in their program code means as well. Furthermore, the embodiments may be embodied as code stored in a computer-readable medium of virtually any kind including, without limitation, RAM, ROM, magnetic media, optical media, or magneto-optical media. Even more generally, the embodiments could be implemented in software, or in hardware, or any combination thereof including, but not limited to, software running on a general purpose processor, microcode, PLAs, or ASICs.

It is also envisioned that embodiments could be accomplished as computer signals embodied in a carrier wave, as well as signals (e.g., electrical and optical) propagated through a transmission medium. Thus, the various information discussed above could be formatted in a structure, such as a data structure, and transmitted as an electrical signal through a transmission medium or stored on a computer readable medium.

It is also noted that many of the structures, materials, and acts recited herein can be recited as means for performing a function or steps for performing a function. Therefore, it should be understood that such language is entitled to cover all such structures, materials, or acts disclosed within this specification and their equivalents.

What is claimed is:

1. A method of determining a transmission error, said method comprising:

receiving, at a receiver, transmissions of a plurality of codewords corresponding to encoded first and second packets of data;

determining at said receiver an error in decoding one of said codewords of said encoded first packet of data;

transmitting from said receiver a first error message for use by a transmitter of said codewords indicating that an error has occurred in decoding one of said codewords of said encoded first packet of data;

determining at said receiver that an error has occurred in said transmitter correctly receiving said first error message when one of said codewords does not correlate with said codewords of said encoded first packet of data, said codewords of said encoded first packet being uncorrelatable with said codewords of said encoded second packet; and transmitting a second error message from said receiver for use by said transmitter so as to indicate to said transmitter that said first error message was not received correctly by said transmitter.

2. The method as claimed in claim 1 wherein said transmitting said second error message comprises:

transmitting a continue previous packet message.

3. The method as claimed in claim 1 wherein said transmitting said first error message comprises:

transmitting a NAK message.

4. The method as claimed in claim 1 wherein said determining at said receiver that said error has occurred comprises:

determining that said encoded second packet is being received prior to said encoded first packet being correctly decoded.

5. The method as claimed in claim 1 wherein said second error message indicates to said transmitter to transmit at least one unsent codeword for said packet.

6. The method as claimed in claim 1 wherein said second error message indicates to said transmitter to reinitialize transmission for said encoded first packet.

7. The method as claimed in claim 1 and further comprising:

correcting said error at the physical layer without informing a layer higher than the physical layer.

8. The method as claimed in claim 1 and further comprising:

sending a re-synchronizing signal from said receiver to said transmitter so as to re-synchronize said transmitter with said receiver.

9. A method of determining a transmission error, said method comprising:

transmitting a plurality of codewords for encoded first and second packets of data from a transmitter for use by a receiver, said codewords of said encoded first packet being uncorrelatable with said codewords of said encoded second packet;

configuring said transmitter to process a first error message indicating that one of said plurality of codewords of said encoded first packet of data was received by said receiver; and receiving a second error message at said transmitter indicating that said first error message was not correctly received by said transmitter.

10. The method as claimed in claim 9 and further comprising:

re-initializing transmission of said first codeword of data in response to said second error message.

11. The method as claimed in claim 9 wherein said second error message is a continue previous packet message and said transmitter is configured to process said continue previous packet message.

12. The method as claimed in claim 9 and further comprising:

transmitting a resynchronization signal from said transmitter so as to resynchronize said transmitter with said receiver.

13. A wireless communication device comprising:

a processor configured to determine an error in decoding a codeword for encoded first and second packets of data represented by a plurality of codewords, and configured to instruct transmission of a first error message for use by a transmitter of said codeword indicating that an error has occurred in decoding one of said plurality of codewords of said encoded first packet, and configured to determine that an error has occurred in said transmitter correctly receiving said first error message when one of said codewords does not correlate with said codewords of said encoded first packet of data, said codewords of said encoded first packet being uncorrelatable with said codewords of said encoded second packet, and configured to instruct transmission of a second error message for use by said transmitter so as to indicate to said transmitter that said first error message was not received correctly by said transmitter; and a memory coupled with said processor.

14. The wireless communication device as claimed in claim 13 wherein said processor is further configured for instructing transmission of said second error message by instructing transmission of a continue previous packet message.

15. The wireless communication device as claimed in claim 13 wherein said processor is configured for transmitting said first error message as a NAK message.

16. The wireless communication device as claimed in claim 13 wherein said processor is further configured for determining that a codeword for said encoded second packet is being received prior to said encoded first packet being determined by said wireless communication device.

17. The wireless communication device as claimed in claim 13 wherein said second error message indicates to said transmitter to transmit at least one unsent codeword for said packet.

18. The wireless communication device as claimed in claim 13 wherein said second error message indicates to said transmitter to re-initialize transmission for said encoded first packet.

19. The wireless communication device as claimed in claim 13 wherein said processor is configured to inform a layer higher than the physical layer of the error and to correct the error at the higher layer.

20. The wireless communication device as claimed in claim 13 wherein said processor is configured for sending a re-synchronization signal from said receiver to said transmitter so as to re-synchronize said transmitter with said receiver.

21. A wireless communication device comprising:

a processor configured to transmit a plurality of codewords for encoded first and second packets of data from a transmitter in said wireless communication device for use by a receiver, said codewords of said encoded first packet being uncorrelatable with said codewords of said encoded second packet, and further configured to process a first error message indicating that one of a plurality of codewords for said encoded first packet of data was received by a receiver, and configured to process a second error message indicating that said first error message was not correctly received by said wireless communication device.

22. The wireless communication device as claimed in claim 21 wherein said processor is further configured to instruct re-initialization of transmission of a first codeword in response to said second error message.

23. The wireless communication device as claimed in claim 21 wherein said second error message is a continue previous packet message and said processor is configured to process said continue previous packet message.

24. The transmitter as claimed in claim 21 wherein said processor is further configured to instruct transmission of a resynchronization signal so as to resynchronize said transmitter with said receiver.

25. An apparatus for determining a transmission error, said apparatus comprising:

means for receiving transmissions of a plurality of codewords corresponding to encoded first and second packets of data;

means for determining an error in decoding one of said codewords of said encoded first packet of data;

means for transmitting a first error message for use by a transmitter of said codewords indicating that an error has occurred in decoding one of said codewords of said encoded first packet of data;

means for determining that an error has occurred in said transmitter correctly receiving said first error message when one of said codewords does not correlate with said codewords of said encoded first packet of data, said codewords of said encoded first packet being uncorrelatable with said codewords of said encoded second packet; and means for transmitting a second error message for use by said transmitter so as to indicate to said transmitter that said first error message was not received correctly by said transmitter.

26. The apparatus as claimed in claim 25 wherein said means for transmitting said second error message comprises:

means for transmitting a continue previous packet message.

27. The apparatus as claimed in claim 25 wherein said means for transmitting said first error message comprises:

means for transmitting a NAK message.

28. The apparatus as claimed in claim 25 wherein said means for determining that said error has occurred in decoding one of said codewords comprises:

means for determining that said encoded second packet is being received prior to said encoded first packet being correctly decoded.

29. The apparatus as claimed in claim 25 wherein said second error message indicates to said transmitter to transmit at least one unsent codeword for said packet.

30. The apparatus as claimed in claim 25 wherein said second error message indicates to said transmitter to reinitialize transmission for said encoded first packet.

31. The apparatus as claimed in claim 25 and further comprising:

means for correcting said error at the physical layer without informing a layer higher than the physical layer.

32. The apparatus as claimed in claim 25 and further comprising:

means for sending a re-synchronizing signal from said receiver to said transmitter so as to re-synchronize said transmitter with said means for receiving.

33. An apparatus for determining a transmission error, said apparatus comprising:

means for transmitting a plurality of codewords for encoded first and second packets of data for use by a receiver, said codewords of said encoded first packet being uncorrelatable with said codewords of said encoded second packet;

means for configuring said means for transmitting to process a first error message indicating that one of said plurality of codewords of said encoded first packet of data was recieved by said receiver; and means for receiving a second error message indicating that said first error message was not correctly received by said means for transmitting.

34. The apparatus as claimed in claim 33 and further comprising:

means for re-initializing transmission of said first codeword of data in response to said second error message.

35. The apparatus as claimed in claim 33 wherein said second error message is a continue previous packet message and said transmitter is configured to process said continue previous packet message.

36. The apparatus as claimed in claim 33 and further comprising:

means for transmitting a resynchronization signal from said transmitter so as to resynchronize said means for transmitting with said receiver.

* * * * *